United States Patent [19]

Lisowski

[11] Patent Number: 5,026,016
[45] Date of Patent: Jun. 25, 1991

[54] RETAINER CLIP
[75] Inventor: Walter E. Lisowski, Chicago, Ill.
[73] Assignee: Helm Products, Inc., Chicago, Ill.
[21] Appl. No.: 453,919
[22] Filed: Dec. 20, 1989
[51] Int. Cl.[5] .................... A47F 5/00; A47B 96/06
[52] U.S. Cl. ................... 248/314; 248/221.3; 248/225.1
[58] Field of Search ............... 248/223.4, 224.1, 224.2, 248/224.3, 225.1, 224.4, 360, 682, 314, 222.4; 381/205

[56] References Cited
U.S. PATENT DOCUMENTS

| | | | |
|---|---|---|---|
| 1,252,207 | 1/1918 | Walker | 248/224.1 X |
| 3,021,105 | 2/1962 | Swislow | 248/224.1 |
| 3,346,227 | 10/1967 | hankin | 248/224.1 X |
| 4,088,848 | 5/1978 | Weed | 381/205 X |
| 4,346,868 | 8/1982 | Lindner | 248/223.4 X |
| 4,805,861 | 2/1989 | Thalenfeld | 248/223.4 X |

Primary Examiner—J. Franklin Foss
Attorney, Agent, or Firm—Leydig, Voit & Mayer

[57] ABSTRACT

A one-piece molded retainer clip is mountable onto any desired surface. The retainer clip includes a back wall for mounting to the surface and a raised front wall having a mounting button access slot formed therein. A clip finger having a resilient end portion extends from the back wall into the access slot to bear against the mounting button when inserted therein. The access slot has a pair of guide walls and overlying wall portions to engage and retain a flange of the mounting button. The clip finger preferably is biased against the mounting button and can include a projection for engagement with the mounting button or an electrical ground or a resilient biasing member.

18 Claims, 2 Drawing Sheets

RETAINER CLIP

FIELD OF THE INVENTION

The present invention relates generally to retainer clips to be mounted on a surface, and more particularly is directed to a compact plastic integral molded clip having an access slot and mating clip finger, which are designed to retain a mounting button therein.

BACKGROUND OF THE INVENTION

Numerous types of prior art retainer clips have been developed to retain mounting buttons of various devices, such as microphones therein. The prior art clips typically have been formed wholly or partially of metal and hence are susceptible to scratches, corrosion and rust and can damage the surfaces to which they are mounted.

Two such prior art retainer clips are sold by Radio Shack under Catalog Numbers 21-923 and 21-1130. The '923 clip is a one piece metal clip with top and bottom mounting walls connected by side walls to a raised clip central wall portion. A clip finger is stamped out of one side wall, with part of the periphery cut out and away from the central wall portion and connecting only to the top mounting wall through the side wall. The clip finger is bent downwardly away from the central wall portion and extends beneath the access slot formed by the cut out clip. The clip finger is the same thickness as the rest of the clip and bends at the side wall. The clip finger includes a raised button near the end to fit into the hole formed centrally in most device mounting buttons. The '923 clip can be screwed or adhesively adhered to the desired mounting surface. The '1130 clip also is a metal clip stamped from a piece of metal which is cut out to form an access slot which is bent back above the body of the clip. No clip finger is formed in the '1130 clip. The clip is adapted to include a magnet mounted to the bottom of the clip body which then can be mounted magnetically to the appropriate metal surface.

A third prior art type of clip is frequently provided with radio microphones. This clip also is a one-piece stamped clip having a mounting wall and a clip wall connected to and extending therefrom. The clip wall has two arms forming the access slot with a clip finger cut from and extending between the two arms from the clip wall. The clip finger is bent in multiple points to provide a bias against a mounting button inserted into the access slot. The clip finger again bends at the clip wall.

Applicant has seen two other types of clips. One clip was formed from an integral raised plastic shell body, having an access slot formed in a front wall and opening to one edge. The clip included an integral perpendicular side wall formed around the front wall, except for the access slot edge, without a clip finger. The other type of clip had a similar type of plastic shell body, with a second piece of metal forming a back plate and providing a metal clip finger to provide a grounding function for the clip. Each of the prior art metallic clips requires several stamping and forming operations to manufacture the retainer clip. The one prior art plastic retainer clip does not provide for grounding or a clip finger at all.

It would be desirable to provide a compact retainer clip, formed only of plastic, having a clip finger with a resilient end portion, which does not require the numerous manufacturing steps of the prior art clips.

OBJECTS AND SUMMARY OF THE INVENTION

It is, therefore, a primary object of the present invention to provide an integral one-piece compact plastic retainer clip having a clip finger with a resilient end portion formed therein.

A further object of the present invention is to provide a retainer clip which is easily manufactured in a single molding operation.

It is yet another object of the present invention to provide a clip finger which can provide an electrical ground and is biased to retain a mounting button in the present invention.

In general the present invention contemplates a one-piece molded plastic retainer clip body which can be mounted to a wall or other surface. The body includes a back mounting surface and a raised front wall portion, which includes an access slot formed therein. The access slot is formed to retain a mounting button therein in conjunction with a clip finger which extends into the access slot from a back wall portion which extends away from the access slot. The clip finger has a resilient end portion. The clip finger can include an electrical ground and can be biased against a mounting button inserted into the access slot.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
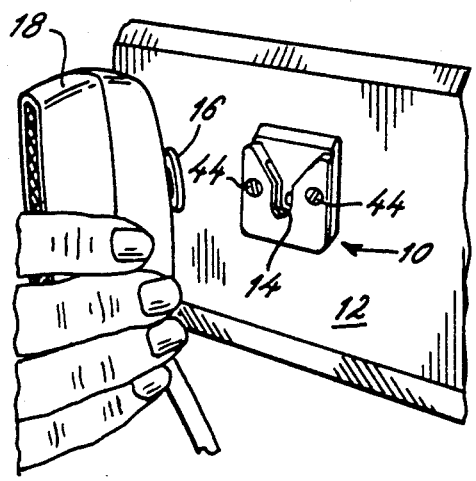
FIG. 1 is a perspective view of a retainer clip in accordance with the present invention mounted to a wall surface.

Turning to the drawings, there is shown in FIG. 1 a retainer clip of the present invention generally indicated by the reference numeral 10. The retainer clip 10 is shown mounted to a wall surface 12, which can be any type of surface. For example, the surface can be a vehicle or boat dashboard or other surface oriented horizontally or vertically or otherwise The retainer clip 10 includes an access slot 14 into which a mounting button 16 of a device 18 is inserted by a user for retention and easy access. The device 18 can be a microphone, such as for hikers, citizen band (C.B.) and two-way radios, or can be a remote control for T.V.'s or other devices.

Figure 2:
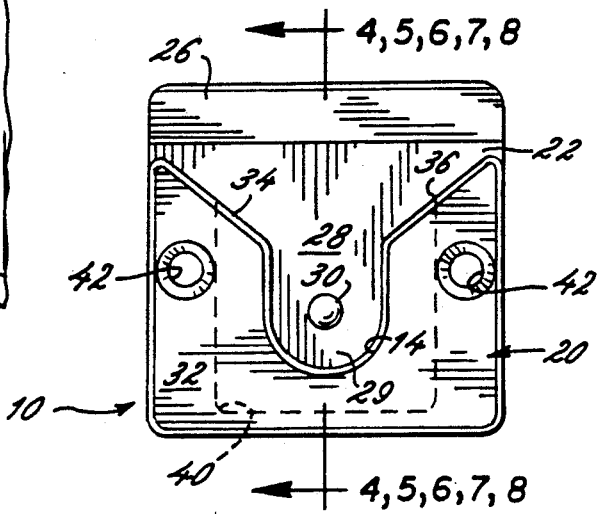
FIG. 2 is a front plan view of the retainer clip shown in FIG. 1.
Figure 3:
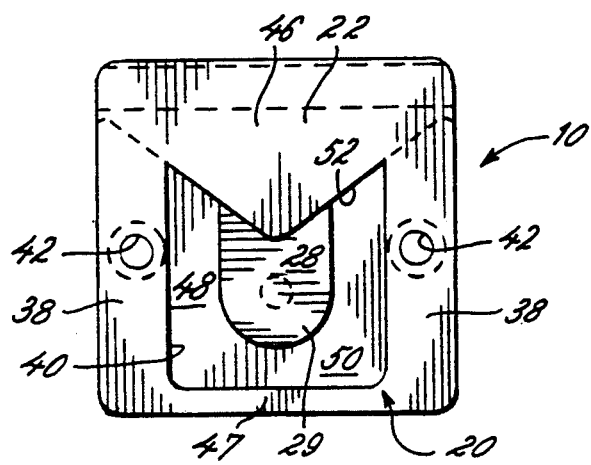
FIG. 3 is a rear plan view of the retainer clip shown in FIG. 1.
Figure 4:
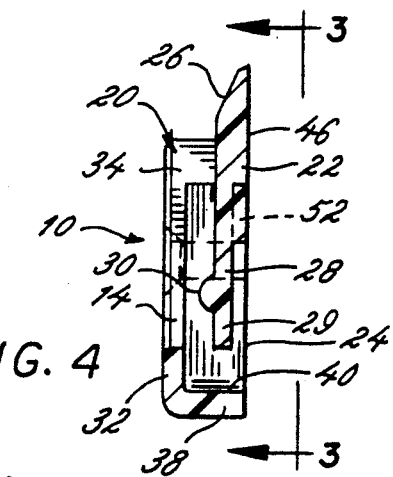
FIG. 4 is a side sectional view as shown in and taken along the line 4—4 in FIG. 2.

Referring to FIGS. 2–4, the retainer clip 10 is formed with an integral one-piece plastic body 20. The body 20 includes a back wall portion 22 which forms a mounting surface 24. The back wall portion 22 includes an inclined ramp or guide surface 26, which both serve to guide the mounting button 16 into the access slot 14 and to protect the surface 12.

A clip finger 28 is formed with said back wall portion 22 and extends into the access slot 14. The clip finger 28 includes a resilient end portion 29, which can be formed in several ways, as described hereinafter. The clip finger 28 can include a projection 30, which will bear against a complementary opening in the mounting button 16. The clip finger 28 is configured to be a complement of the access slot 14 so that a single action injection mold can be utilized, without any side molding operations.

The retainer clip body 20 includes a raised front wall portion 32 in which the access slot 14 is formed. The front wall portion 32 includes a pair of inclined guide walls 34, 36 formed between the back wall portion 22 and the front wall portion 32 to provide a guide for insertion of the mounting button 16 into the access slot 14. The front wall portion 32 also is connected to the back wall portion 22 by a connecting rib or sidewalls 38 formed around a rear opening 40.

The body 20 includes at least one and preferably a pair of retainer clip mounting passageways 42 therethrough. As illustrated, a pair of passageways 42 are formed through the connecting rib 38 opening to both the top and bottom surfaces of the retainer clip 10. As illustrated in FIG. 1, a pair of screws 44 can be inserted through the passageways 42 to mount the retainer clip 10 to a surface, such as the surface 12. A single mounting passageway (not illustrated) also could be formed through a central portion 46 (FIG. 3) of the back wall portion 22. A second mounting passageway (not illustrated) could be formed in conjunction with the one in portion 46 through a portion 47 of the rib 38, which could be made thicker.

The opening 40 is provided for the molding operation and allows formation of a pair of overhanging wall portions or wings 48, 50 formed in the top wall portion 32, which retain the flange on the mounting button 16 when inserted into the access slot 14. The clip finger 28 preferably is a central extension of the back wall portion 22, which is thinner than the back wall portion 22 and is offset from the back surface 24. The clip finger 28 also preferably is formed as an extension of a base V-shaped portion 52 of the raised wall portion 22, which adds strength to the clip finger 28.

The clip finger 28 being thinner than the back wall portion 22 is one way to provide the resilient end portion 29. The end portion 29 also can be formed by tapering the clip finger 28 from the back wall portion 22 to the free end thereof The taper can be in thickness and/or in width of the clip finger 28. Any of these methods render the end portion 29 resilient to bear against the mounting button 16.

Figure 5:
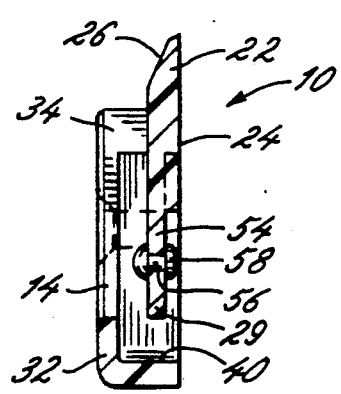
FIG. 5 is s a side sectional view as shown in and taken along the line 5—5 in FIG. 2 illustrating a second embodiment of clip finger of the present invention.

Referring to FIG. 5, a second embodiment 54 of the clip finger 28 is illustrated. Other portions of the retainer clip 10 in FIG. 5 and succeeding Figures are the same as those previously described and hence the same reference numerals will be utilized. The clip finger embodiment 54 does not include the projection 30, but instead includes a passageway or aperture 56 therethrough. A metal rivet or screw 58 is mounted in the passageway 56, to form an electrical contact for the clip finger embodiment 54. The contact 58 is utilized to form an automatic return contact, when the device 18 is inserted into the access slot 14.

Figure 6:
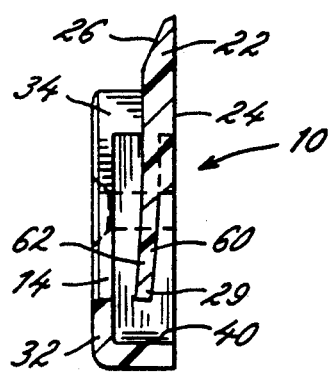
FIG. 6 is a side sectional view as shown in and taken along the line 6—6 in FIG. 2 illustrating a third embodiment of clip finger of the present invention.

A third embodiment 60 of the clip finger 28 is shown in FIG. 6. In this embodiment, the clip finger 60 again does not include the projection 30, but instead is formed with an upturned or curved configuration 62, which will bear against the mounting button 16.

Figure 7:
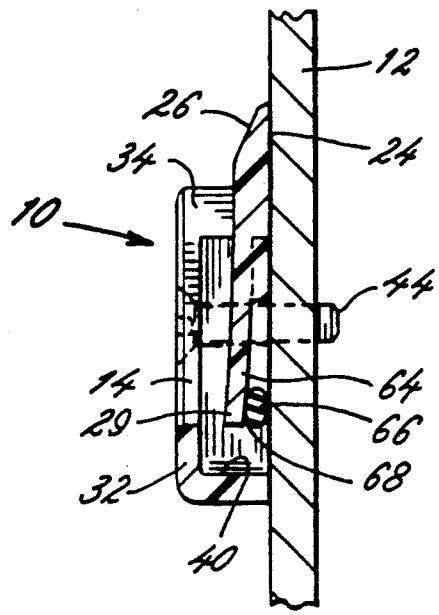
FIG. 7 is a side sectional view as shown in and taken along the line 7—7 in FIG. 2 illustrating a fourth embodiment of clip finger of the present invention.

A fourth embodiment 64 of the clip finger 28 is best illustrated in FIG. 7, with the retainer clip 10 shown mounted on the wall 12 by the screws or bolts 44. The embodiment 64 includes a resilient button or bumper 66 adhered to a back end portion 68 of the clip finger embodiment 64. The bumper 66 can be formed from any type of elastomeric material and can be secured to the portion 68 by adhesive.

Figure 9:
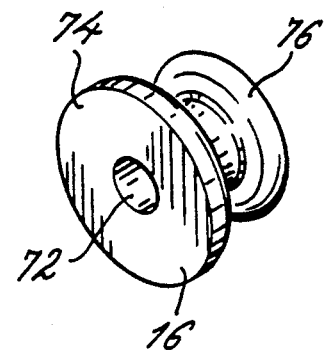
FIG. 9 is a perspective view of one conventional mounting button which the retainer clip of the present invention is designed to retain.
Figure 8:
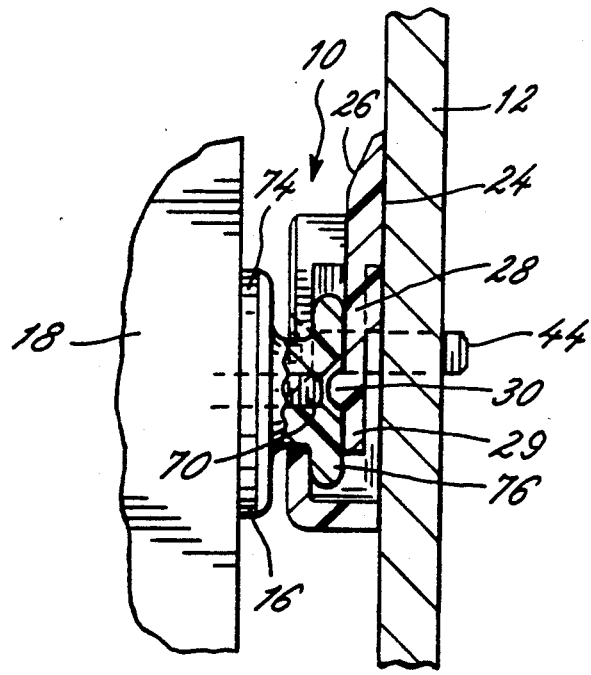
FIG. 8 is a side sectional view as shown in and taken along the line 8—8 in FIG. 2 illustrating the retainer clip with a device inserted therein and mounted to wall surface as shown in FIG. 1.

The operation of the retainer clip 10 is best illustrated with reference to FIGS. 9 and 10. The device 18, such as a microphone, has the mounting button 16 mounted thereto, such as by adhesive or a bolt 70. The bolt 70 is inserted into one end of a passageway 72, formed in a mounting flange 74 of the mounting button 16. The projection 30 of the clip finger 28 snaps into the opposite end of the passageway 72, or a second passageway, if the passageway 72 does not extend through the mounting button 16.

The mounting button 16 may or may not be formed with the flange 74, but will be formed with a second retainer flange 76. The flange 76 is retained in the access slot 14 by the clip finger 28 bearing against the mounting button 16, which engages the flange 76 with the wall portions or wings 48, 50. The snap fit of the projection 30, or the rivet 56, or the biased clip finger embodiments 60 and 64, positively retain the device 18 in the retainer clip 10 until the user desires to remove the device 18.

The retainer clip 10 is easily manufactured by a single unidirection molding process into a compact one-piece plastic body. The plastic material can be a high impact plastic material such as, for example, DuPont ST801 nylon. The resulting retainer clip 10 is non-corrosive and will not scratch the surface on which it is mounted. The retainer clip 10 also can be mounted to the surface, such as the surface 12, by adhesive if desired.

I claim as my invention:

1. A retainer clip for retaining various devices having an affixed mounting button with a reduced central portion and an enlarged end comprising:

a one-piece molded plastic clip body adapted to be mounted to a wall or other surface and to retain the mounting button therein;

said clip body including a back wall having a back surface to be mounted to said wall;

said clip body including a raised front wall portion, including an access slot formed therein adapted to receive said reduced central portion of the mounting button in said access slot, and including a pair of inclined guide walls to guide said reduced central portion of the mounting button into said access slot; and said clip body including side wall portions extending rearward from the front wall to the back wall;

said clip body including a clip finger depending from the back wall portion and having an end portion extending downward into said access slot, said clip finger having at least a section of the end portion which is thinner than the back wall and offset from the back surface so that the end portion of said clip finger is rendered resilient to bear against said mounting button when inserted into said access slot, whereby the reduced central portion of the mounting button extends through the access slot and the clip finger bears against the mounting button to hold the enlarged end of the mounting button against the front wall portion to retain the device when it is disposed within the retainer clip.

2. The retainer clip of claim 1 wherein said clip finger is tapered from said back wall portion to said clip finger end portion to form said resilient end portion.

3. The retainer clip of claim 1 including said back wall portion having a first thickness and said clip finger have a second thickness less than said first thickness.

4. The retainer clip of claim 1 including said back wall portion having a V-shaped central projection with said clip finger formed extending therefrom.

5. The retainer clip of claim 1 wherein said back wall portion has a guide ramp formed on one edge thereof opposite said access slot.

6. The retainer clip of claim 1 wherein said clip body is formed from high impact plastic.

7. The retainer clip of claim 1 wherein said clip body has at least one mounting passageway extending therethrough and opening to said back surface.

8. The retainer clip of claim 1 wherein said clip finger includes a projection adjacent a free end thereof to bear against said mounting button.

9. The retainer clip of claim 1 wherein said clip finger includes a metal button mounted therethrough adjacent a free end thereof to form an electrical contact.

10. The retainer clip of claim 1 wherein said clip finger is formed with a curved configuration to bear against said mounting button.

11. The retainer clip of claim 1 wherein said clip finger includes a resilient body mounted thereto to bias said clip finger against said mounting button.

12. A retainer clip for retaining various devices having an affixed mounting button with a reduced central portion and an enlarged end, comprising:

a one-piece molded plastic clip body formed from high impact plastic and adapted to be mounted to a wall or other surface and to retain the mounting button affixed to various devices therein;

said clip body including a back surface to be mounted to said wall;

said clip body including at least one mounting passageway extending therethrough and opening to said back surface;

said clip body including a raised front wall portion having three side walls depending therefrom, the raised front wall portion including an access slot formed therein opening to a fourth side of said front wall portion, the access slot being adapted to receive said mounting button therein, the raised front wall portion including a pair of inclined guide walls depending from said front wall portion fourth side to guide said reduced central portion of the mounting button into said access slot and including a pair of overlying wall portions adjacent said access slot for bearing against the enlarged end of said mounting button; and said clip body including a back wall portion offset from said front wall portion and extending away from said access slot adjacent said inclined guide walls, the back wall including a guide ramp formed on one edge thereof opposite said access slot and forming a rear guide for said mounting button; and said clip body including a resilient clip finger depending from the back wall portion and having an end portion extending into said access slot, an end portion extending into said access slot, the end portion of said clip finger having at least a section which is thinner than the back wall and offset from the back surface so that the end portion of said clip finger is rendered resilient to bear against said mounting button when inserted into said access slot, whereby the reduced central portion of the mounting button extends through the access slot and the clip finger bears against the mounting button to hold the enlarged end of the mounting button against the front wall portion to retain the device when it is disposed within the retainer clip.

13. The retainer clip of claim 12 wherein said back wall portion has a first thickness and said clip finger has a second thickness less than said first thickness; and said back wall portion has a V-shaped central projection with said clip finger formed extending therefrom.

14. The retainer clip of claim 12 wherein said clip finger includes a projection adjacent a free end thereof to bear against said mounting button.

15. The retainer clip of claim 12 wherein said clip finger includes a metal button mounted therethrough adjacent a free end thereof to form an electrical contact.

16. The retainer clip of claim 12 wherein said clip finger is formed with a curved configuration to bear against said mounting button.

17. The retainer clip of claim 12 wherein said clip finger includes a resilient body mounted thereto to bias said clip finger against said mounting button.

18. A retainer clip for retaining various devices having an affixed mounting button with a reduced central portion and an enlarged end, comprising:

a one-piece molded plastic clip body adapted to be mounted to a wall or other surface and to retain the mounting button therein;

said clip body including a back wall having a back surface to be mounted to the wall;

said clip body including a raised front wall portion including an access slot formed therein adapted to receive the reduced central portion of the mounting button in the access slot, and including a pair of inclined guide walls to guide the reduced central portion of the mounting button into the access slot;

said clip body including side wall portions extending rearward from the front wall to the back wall; and said back wall including a clip finger having an end portion extending into the access slot, the access slot being at least as large as the clip finger so that the retainer clip can be molded in a single action mold, the end portion of said clip finger being resilient to bear against the mounting button when inserted into the access slot, whereby the reduced central portion of the mounting button extends through the access slot and the clip finger bears against the mounting button to hold the enlarged end of the mounting button against the front wall portion to retain the device when it is disposed within the retainer clip.

* * * * *